United States Patent
Jonsson

(10) Patent No.: US 8,182,395 B2
(45) Date of Patent: May 22, 2012

(54) METHOD FOR ADAPTING VEHICLE DRIVETRAIN CONTROL BASED ON A MEASURED PTO LOAD

(75) Inventor: Johan Jonsson, Göteborg (SE)

(73) Assignee: Volvo Lastvagnar AB, Göteborg (DE)

( * ) Notice: Subject to any disclaimer, the term of this patent is extended or adjusted under 35 U.S.C. 154(b) by 356 days.

(21) Appl. No.: 12/522,182

(22) PCT Filed: Feb. 21, 2007

(86) PCT No.: PCT/SE2007/000153
§ 371 (c)(1),
(2), (4) Date: Jul. 6, 2009

(87) PCT Pub. No.: WO2008/103076
PCT Pub. Date: Aug. 28, 2008

(65) Prior Publication Data
US 2010/0022348 A1    Jan. 28, 2010

(51) Int. Cl.
*B60W 10/04* (2006.01)
(52) U.S. Cl. .......................... 477/107; 477/110
(58) Field of Classification Search .................. 477/107, 477/110, 111, 115
See application file for complete search history.

(56) References Cited

U.S. PATENT DOCUMENTS

| | | | |
|---|---|---|---|
| 5,740,044 A | 4/1998 | Ehrenhardt et al. | |
| 6,080,081 A | 6/2000 | Sauermann et al. | |
| 7,925,405 B2 * | 4/2011 | Carey et al. | 701/51 |
| 7,931,560 B2 * | 4/2011 | Karlsson et al. | 477/111 |
| 7,950,510 B2 * | 5/2011 | Marsh et al. | 192/54.51 |
| 8,001,848 B2 * | 8/2011 | White et al. | 73/862.327 |
| 2001/0036882 A1 | 11/2001 | Hrazdera | |
| 2006/0116238 A1 | 6/2006 | Karlsson et al. | |
| 2006/0241840 A1 | 10/2006 | Steen et al. | |
| 2008/0194383 A1* | 8/2008 | Berglund | 477/97 |

OTHER PUBLICATIONS

International Search Report for corresponding International Application PCT/SE2007/000153, Mailing Date: Oct. 26, 2007.

* cited by examiner

*Primary Examiner* — Ha D. Ho
(74) *Attorney, Agent, or Firm* — WRB-IP LLP

(57) ABSTRACT

A method for adapting a drive train based upon a PTO load is provided. The method includes continually during vehicle driving determining a torque magnitude indicative of said power take off unit's torque consumption by sensing a fluid pressure produced by a power take off fluid pump. The sensed power take off unit torque consumption is continually compared with an output torque produced by a prime mover. Using the difference from said output torque expected value and the measured PTO torque consumption, a control unit adjusts transmission shifting (if automatic) of a transmission and/or prime mover control because the PTO will cause the prime mover to lose some of its available torque. Based on the PTO load, the engine control will selected the appropriate prime mover torque production and the transmission control unit will select the appropriate start gear, upshift gears, and downshift gears.

7 Claims, 2 Drawing Sheets

METHOD FOR ADAPTING VEHICLE DRIVETRAIN CONTROL BASED ON A MEASURED PTO LOAD

BACKGROUND AND SUMMARY

The present disclosure relates to determining the magnitude of a power take off unit and adapting a drive train of a heavy commercial vehicle based on the presence of an additional load of the power take off unit.

Heavy commercial vehicles such as overland trucks and buses are known to employ automatic mechanical transmissions (AMT) that are based on preprogrammed routines. One example of an automatic mechanical transmission is the multi-stage gearbox. A multi-stage gearbox is usually made up of an input shaft, an intermediate shaft, which has at least one gearwheel in engagement with a gearwheel on the input shaft, and a main shaft with gearwheels which engage with gearwheels on the intermediate shaft. The main shaft is also connected to an output shaft coupled to the driving wheels via, for example, a drive shaft. Each pair of gearwheels has a different ratio compared with another pair of gearwheels in the gearbox. Different gears are obtained by virtue of different pairs of gearwheels transmitting the torque from the engine to the driving wheels.

One of the problems in controlling an AMT, however, is attributable to the power consumption by a power take off (PTO). A PTO can generally be classified as a PTO upstream or downstream of the master clutch, hi general, a PTO that is upstream of the master clutch can take power from the vehicle's engine regardless of the state of engagement of the transmission via the master clutch. A PTO that is located downstream of the master clutch is typically used when the vehicle is stationary. A downstream PTO often involves placing the gearbox in neutral so that the vehicle wheels are not drivingly engaged to the transmission. However, there are cases when a transmission mounted PTO is used while the vehicle is in motion. PTOs are known to impose significant load on the vehicle's engine. Exemplary PTOs use engine power to drive PTO connected hydraulic pumps that can be activated for such things as mixing applications (concrete trucks) or causing motion of a bed on the truck such as in the case of dump trucks and flat-bed haulers.

Similarly, PTOs may be used to power spreaders such as those used to broadcast salt or sand on icy roads, or to power associated trailer components such as compartment refrigeration units. While these examples are not exhaustive, they do serve to exemplify PTO loads of significant magnitude which can appreciably compromise the driving power available from the engine of the vehicle for the drive wheels, and which often causes undesirable disturbances to automated transmission programs that do not take their intermittent influences into account. For purposes of comparison, these significant PTO loads can be compared to less influential engine loads imposed by such power consumers as cooling fans and air conditioning compressors. As an example of the potential drag that a PTO can impose on the vehicle's engine, it is not uncommon for PTOs to siphon off engine torque on the order of 5 to 3000 Nm. An example of a PTO that requires on the order of 3000 Nm is a fire truck that operates a water pump, and an example of a PTO that requires on the order of 5 Nm is a PTO for a small refrigerator device.

The present invention appreciates the fact that transmission control routines that do not take into consideration whether or not a significant PTO load is imposed on the vehicle's engine will experience degradation in performance when the PTOs are operational. For example, if the PTO loads are of such magnitude that the engine can not compensate therefore by increased engine speed, there will be an effective reduction in power available for driving the vehicle. The strategy must, however, appreciate that the behavior of the PTO-loaded engine is not that of a smaller engine, but is in fact a unique behavior of the particular engine whose power is divided between a PTO of significant load and the drivetrain.

In at least one embodiment, the present invention takes the form of a method for adjusting drivetrain control of a vehicle. Said vehicle drivetrain comprises a prime mover connected to a transmission and a power take off unit driven by said prime mover. The method is characterized in continually during vehicle driving determining a torque magnitude indicative of said power take off unit's torque consumption by sensing a fluid pressure produced by a power take off fluid pump for driving a power take off unit power consumer with variable or constant power need. The method is further characterized in continually comparing the sensed power take off unit torque consumption with an output torque produced by said prime mover and adjusting operation of the drivetrain in consideration of, a by said power take off unit, reduced torque available for application to an output shaft of the transmission under driving conditions.

An advantage of the invention is that a better operation can be performed by the automatic transmission and/or the prime mover. This results in better comfort and efficiency. In another embodiment of the invention the determined torque magnitude of the power take off unit is used for adapting gear selection of the automatic transmission.

In a further embodiment of the invention said power take off fluid pump is a constant displacement pump.

In another embodiment of the invention said prime mover is one of a diesel engine, a gasoline engine, an electric engine, and a hybrid engine.

In another embodiment of the invention said transmission is an automatic transmission.

Further advantageous embodiments of the invention are disclosed herein.

BRIEF DESCRIPTION OF THE DRAWINGS

The present disclosure will now be more fully described, by way of example, with reference to the accompanying drawing in which.

DETAILED DESCRIPTION

Figure 1:
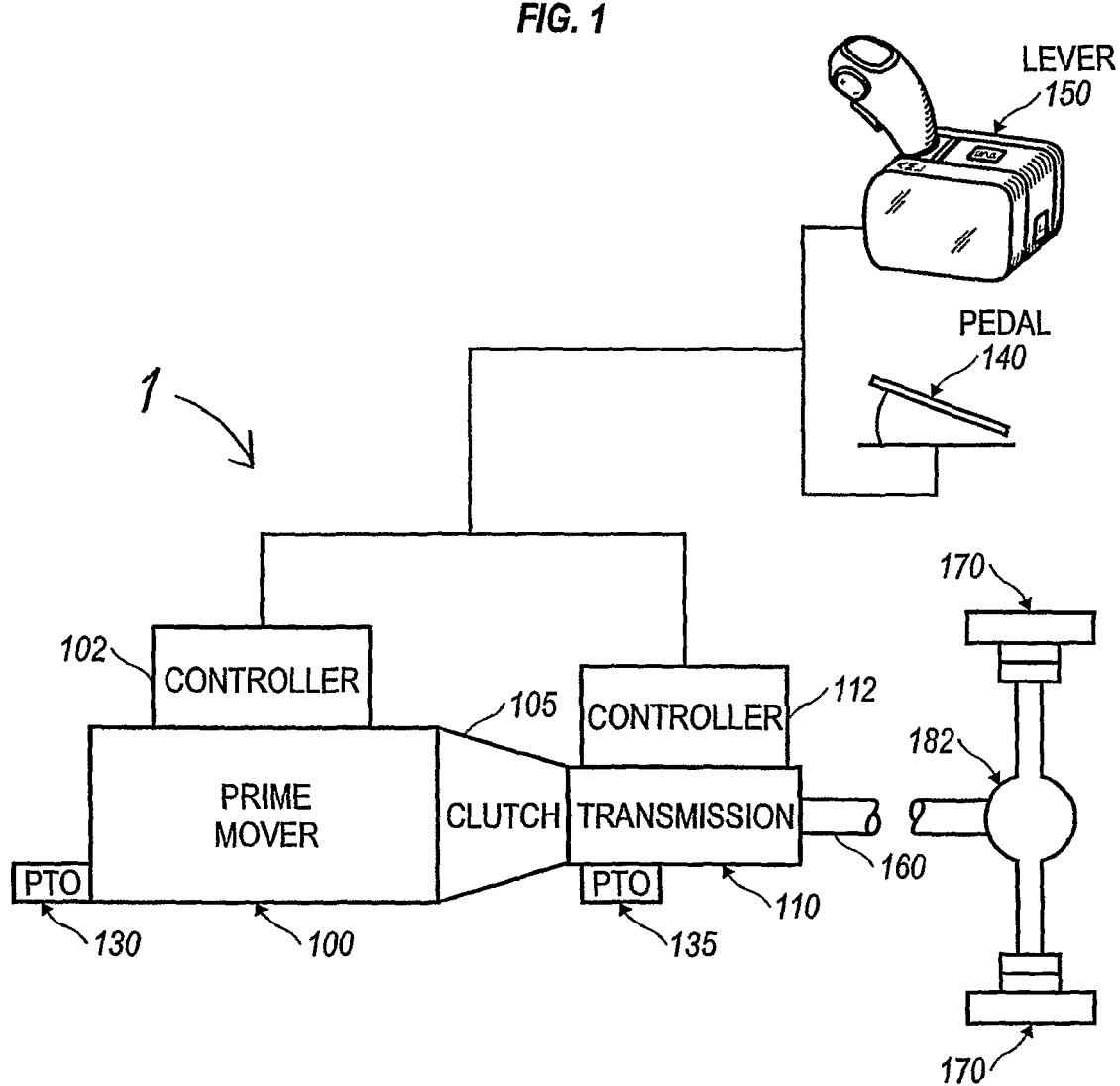
FIG. 1 is a schematic diagram of a power train of a heavy vehicle according to the invention and controls associated therewith.

FIG. 1 illustrates a block diagram showing a drive train 1 with the typical interconnections in an automated mechanical transmission system between engine controller 102, transmission controller 112, shifting lever 150, and accelerator pedal 140. Although not required, when the prime mover 100, typically an internal combustion engine 100, and the transmission 110 are both controlled through electronic control units 102 and 112 (controllers). Information can be shared between these control units 102 and 112. This can lead to efficient exchange of engine information to the transmission 110 and transmission information to the engine 100. Even though the transmission control unit 112 and engine control unit 102 are shown separately, it is contemplated that the control units can be combined in a single unit. Alternatively, the engine control unit 102 and transmission control unit 112 can be made of sub-controllers, for example the transmission control unit 112 might have control units specifically designed to control the gear shifting and gear selection for the transmission 110.

The gear selector/lever 150 enables the driver to select an appropriate driving mode. The driving modes include but are not limited to automatic, manual, and low. Furthermore, in manual mode the driver can request specific shifting of gears using the gear selector 150, preferably through the use of buttons to increase or decrease the gear ratio. As described above, a PTO can be a PTO 130 located upstream of the master clutch 105 or a PTO 135 located downstream of the master clutch 105. The master clutch 105 transfers energy to the transmission 110, which further transfers the energy to the driveshaft 160. Then, a rear gear or differential 182, transfers energy to the drivewheels 170.

Figure 2:
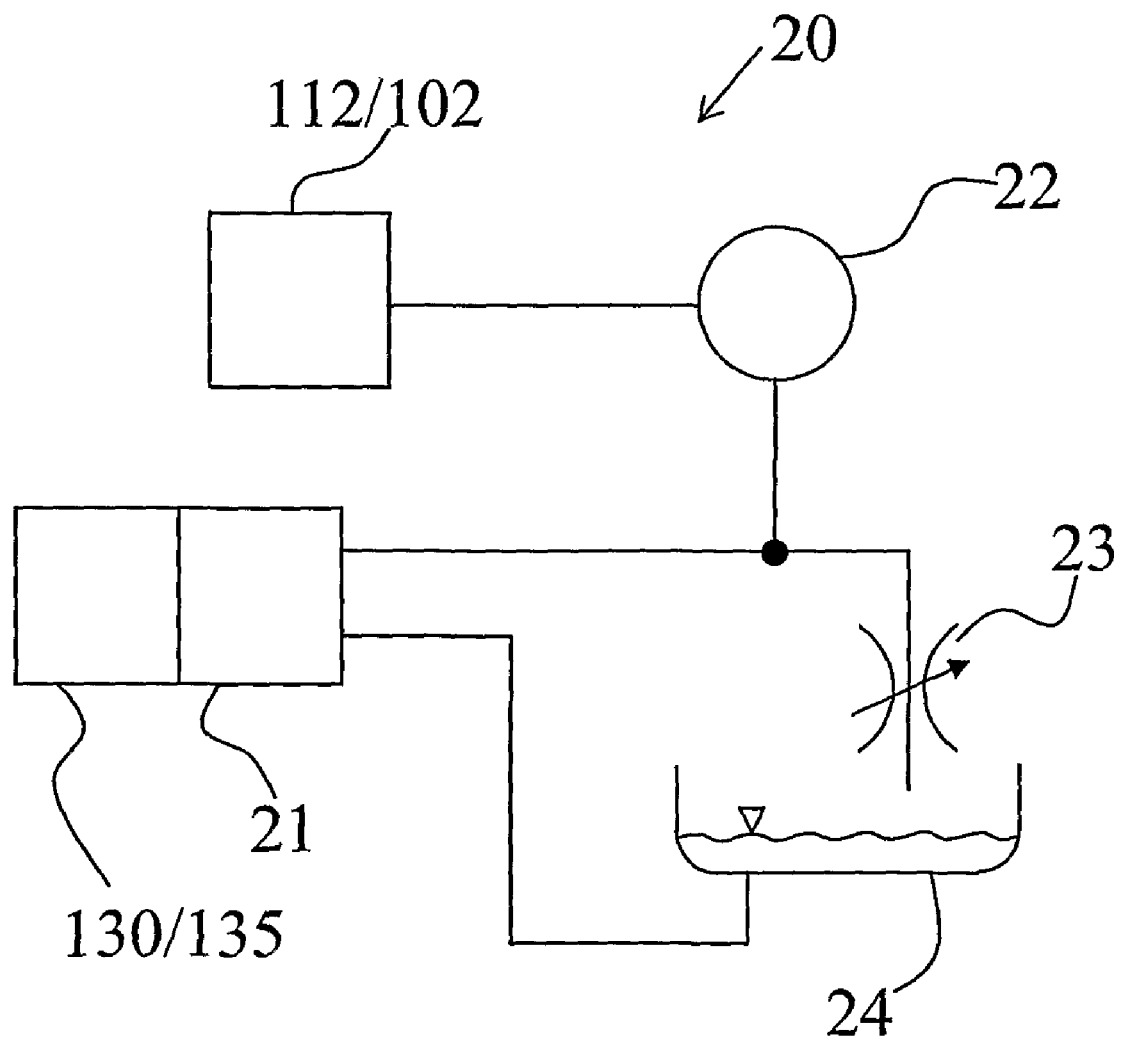
FIG. 2 is a schematic view of a hydraulic circuit comprising power take off fluid pump with a pressure sensor for continually sensing power take off unit's torque consumption according to the invention.

The PTO 130, 135 comprises, as also disclosed in more detail in FIG. 2, a PTO fluid pump 21 for driving a consumer connected to said PTO. The fluid pump 21 is driven by said prime mover via a transmission, which transmission can constitute of different known configurations of for example shafts, gear wheels and/or transmission belts. When said PTO 130, 135 is active the consumer consumes power that should be considered in order to make automated transmission shifting more comfortable, efficient, faster, and to appropriate gear ratios. The power consumption of the consumer can vary over time or be constant, depending on the configuration of the consumer. In order to take into account the additional load of the PTO 130, 135, it is necessary to calculate or otherwise quantify the load. According to the invention a control unit, for example in FIG. 1 or 2 controller 112 and/or 102 or other suitable control unit not disclosed in the figures, can be programmed to continually during vehicle driving determine a torque magnitude, which indicates torque consumption of said PTO. According to the invention the control unit 112 is continually provided with information about current fluid pressure produced by said PTO fluid pump 21 on the pressure side of the fluid pump via a pressure sensor 22. FIG. 20 discloses a hydraulic circuit 20, also comprising a regulator 23 and a fluid tank 24, besides already mentioned PTO fluid pump 21 and pressure sensor 22. The fluid pump 21 is a pump with a constant displacement, which means that the fluid flow can be regarded as proportional to the rotational speed of the prime mover. In this way an installation unique parameter for the relation between pressure output and torque output can be used for continually during driving of the vehicle providing information about current PTO torque load.

The control unit is according to the invention further programmed to continually compare the sensed PTO torque load with an output torque produced by said prime mover. Depending on the magnitude of the difference between the sensed PTO torque load and the output torque produced by said prime mover, the control unit is programmed to adjust operation of the automatic transmission (110) under driving conditions. For example if said difference, i.e. torque available for driving the vehicle, is relatively small due to extensive PTO load the control unit can postpone an upshift to occur at a higher prime mover rotational speed, or if an extensive vehicle travel resistance is present at the same time as an extensive PTO load the control unit can hold current gear and not perform an upshift until the PTO load and/or the vehicle travel resistance have/has decrease to under a predetermined level. Corresponding can apply for downshifting strategies.

The prime mover control unit 102 preferably produces or calculates a value of the prime mover's 100 generated output torque. Alternatively, the torque that is being produced by the prime mover 100 is calculated by the transmission control unit 112. While there are many ways of calculating this prime mover generated value or measured torque magnitude, a few examples involve using the dwell angle of injection into a diesel engine and using current readings in an electric motor where the prime mover is a diesel engine or electric motor, respectively. The prime mover 100 can be any device designed to provide power to the drivetrain of the heavy vehicle. The prime mover 100 can be one of a diesel engine, gasoline engine, other internal combustion engine, an electric motor, or a hybrid engine.

In a further embodiment of the invention other vehicle systems, especially those in the drivetrain, can be adapted in response to the determined torque magnitude (torque draw) of the PTO load, including making adjustments to the shifting strategies of an automatic mechanical transmission. Other vehicle systems include the engine brake, prime mover torque control, and service brakes. Thus, in one further embodiment several systems can be adjusted such as for example shifting strategies and prime mover torque control to compensate for the PTO load. In another embodiment for example just prime mover torque control can be sufficient to adjust in order to compensate for the PTO load.

Assessment of the PTO load is important because it is used when configuring shifts as the vehicle is driven, in this manner, the transmission 110 is permitted to appropriately compensate for the loss of prime mover 100 torque due to the PTO load. The sensitive driving conditions of the vehicle include take off, reversing, slow movement, road speeds, and highway speeds. These conditions exist anytime a gear of the vehicle is selected and motion is caused through the transmission 110. Furthermore, the transmission control unit 112 is adjusted to account for the loss of torque to the PTO 130, 135. Transmission control can be classified by two different types of control, namely gear shifting and gear selection. Gear shifting describes the actual engagement of the mechanical elements of the transmission 110. For example, gear shifting is the process of actually moving the mechanical parts of the transmission 110 in the proper order to engage or disengage a gear or otherwise manipulate the transmission 110 in response to a given request or instruction. Gear selection is the process of selecting the desired gear or decision to maintain the current gear state. Furthermore, gear selection can consider various parameters in order to determine the proper gear selection. In an automated transmission 110, transmission control is carried out by having a gear selection strategy used to determine what the gear should be, then implementing a gear shifting strategy that actually carries out the requested shift in the transmission 100.

FIG. 1 discloses an embodiment of the invention with the two PTO:s 130 and 135. The method according to the invention is also applicable to drivetrains with only one of the two PTO s shown in FIG. 1 applied or in drivetrains with more than two PTO:s.

The method according to the invention can advantageously be applied to drivetrains with torque converter and automatic transmission or drivetrains with different kinds of power shift transmissions or continuously variable transmissions.

While preferred embodiments of the presently disclosed solutions have been shown and described herein, it will be obvious that such embodiments are provided by way of example only. Numerous variations, changes and substitutions will occur to those skilled in the art without departing from the disclosure herein. Accordingly, it is intended that the embodiments claimed be limited only by the spirit and scope of the claims.

What is claimed is:

1. A method for adjusting drive train control of a vehicle, the drive train comprising a prime mover, a transmission connected to the prime mover and a power take off unit driven by the prime mover, comprising:
   continually during vehicle driving determining a torque magnitude indicative of the power take off unit's torque consumption to obtain a sensed power take off unit torque consumption by sensing a fluid pressure produced by a power take off fluid pump for driving a power take off unit power consumer with variable or constant power need,
   continually comparing the sensed power take off unit torque consumption with an output torque produced by the prime mover and adjusting operation of the drive train in consideration of reduced torque available for application to an output shaft of the transmission under driving conditions.

2. The method as recited in claim 1, wherein the adjustment of the drive train comprises adjustment of prime mover control by using a magnitude of the sensed power take off unit torque consumption.

3. The method as recited in claim 1, wherein the adjustment of the drive train comprises an increase in torque output produced by the prime mover, where the increase is dependent of a magnitude of the sensed power take off unit torque consumption.

4. The method as recited in claim 1, wherein the transmission is an automatic transmission.

5. The method as in claim 4, wherein the adjustment of the drive train comprises adapting gear selection of the automatic transmission using a magnitude of the sensed power take off unit torque consumption.

6. The method as recited in claim 1, wherein the power take off fluid pump is a constant displacement pump.

7. The method as recited in claim 1, wherein the prime mover is one of a diesel engine, a gasoline engine an electric engine, and a hybrid engine.

* * * * *